(12) United States Patent
Kohno et al.

(10) Patent No.: US 6,261,380 B1
(45) Date of Patent: Jul. 17, 2001

(54) METHOD OF REUSING A COATED SUBSTRATE HAVING A SURFACE COATING FIXED TO THE SUBSTRATE FROM WHICH DEPOSITS ARE READILY REMOVED

(75) Inventors: Kenji Kohno, Ibaraki; Hiroyuki Mitsuhashi, Kyoto-fu; Shoji Saibara, Toride; Kazushi Miyata, Osaka-fu, all of (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/182,639

(22) Filed: Oct. 30, 1998

Related U.S. Application Data

(62) Division of application No. 08/825,333, filed on Mar. 28, 1997, which is a continuation of application No. 08/559,070, filed on Nov. 16, 1995, now abandoned, which is a continuation of application No. 08/160,854, filed on Dec. 3, 1993, now abandoned.

(30) Foreign Application Priority Data

Dec. 5, 1992 (JP) .................................... 4-350972

(51) Int. Cl.⁷ .............................. B08B 3/14; B32B 3/10; B32B 7/02; B32B 9/00; B32B 27/38
(52) U.S. Cl. .......................... 134/42; 428/140; 428/220; 428/366; 428/413; 428/423.1; 428/480
(58) Field of Search .................................. 428/140, 220, 428/366, 413, 423.1, 480; 134/42

(56) References Cited

U.S. PATENT DOCUMENTS

| | | | |
|---|---|---|---|
| 4,172,177 | * 10/1979 | Sato | 428/413 |
| 4,200,671 | 4/1980 | Krajewski et al. | |
| 4,256,782 | 3/1981 | Tazuke et al. | 427/53.1 |
| 4,786,558 | * 11/1988 | Sumiya et al. | 428/454 |
| 5,093,396 | 3/1992 | Calhoon et al. | |

FOREIGN PATENT DOCUMENTS

| | | |
|---|---|---|
| 0162611 | 11/1985 | (EP) . |
| 2391784 | 5/1978 | (FR) . |
| 1604562 | 12/1981 | (GB) . |
| WO93/01243 | 1/1993 | (WO) . |

OTHER PUBLICATIONS

"Surface" (Hyoumen in Japanese), vol. 30, No. 1 (1992) 32–43.

* cited by examiner

*Primary Examiner*—Randy Gulakowski
*Assistant Examiner*—Yolanda E. Wilkins
(74) *Attorney, Agent, or Firm*—Birch, Stewart, Kolasch & Birch, LLP

(57) ABSTRACT

A method of reusing a coated substrate having a surface coating fixed to the material substrate surface, comprising the steps:

(a) allowing the coated substrate, which carries deposits on its surface, to swell as a coated composition to which said deposits adhere, and (b) drying said coated substrate to reuse said coated substrate wherein the coated substrate comprises a material substrate and a coating composition fixed to the surface of said material substrate, said coating composition comprising a crosslinked water swellable hydrophilic resin which is solid in air at ambient temperature and from which surface deposits are readily removable, such that said coated material substrate is reusable, and wherein the condition of said swellable hydrophilic resin is such that while said hydrophilic resin swells in the presence of water it is not washed away from said surface of said material substrate by water when the deposits are readily removed with water. The method includes the features that (i) said water swellable hydrophilic resin is capable of swelling to a volume at least 1.5 times its initial volume (ii) and said deposits include toner ink.

10 Claims, No Drawings

METHOD OF REUSING A COATED SUBSTRATE HAVING A SURFACE COATING FIXED TO THE SUBSTRATE FROM WHICH DEPOSITS ARE READILY REMOVED

This application is a divisional of copending application Ser. No. 08/825,333, filed on Mar. 28, 1997, which is a continuation of application Ser. No. 08/559,070, fild on Nov. 16. 1995, now abandoned which is a continuation of application Ser. No.: 08/160,854, filed on Dec. 3, 1993, now abandoned the entire contents of which are hereby incorporated by reference.

BACKGROUND OF THE INVENTION

1. Field of the Invention

The present invention relates to a method of reusing a coated substrate having an easily removable coating which is fixed to the surface of material from which the deposit is easily removed with water, such that the coated material can be repeatedly cleaned easily.

2. Description of Related Art

Hitherto it was difficult to remove a water-insoluble deposit from a material surface. For example, liquid oil should be cleaned by water containing a surfactant with considerable labor, or by an organic solvent which is harmful to both the human body and the environment.

Since a waxy or solid deposit is difficult to remove using the surfactant, it should be removed by the organic solvent or mechanically scraped off, which requires heavy work. But such deposit may not be completely removed, or the material to which the deposit is adhered may be damaged. In many cases, the waxy or solid deposit may not be removed.

It is possible to remove the deposit by forming a releasable or soluble coating on the material and removing the deposit together with the coating. However, whenever the coating is removed, a fresh coating must be reformed, or the removed coating generates an additional waste. Therefore, this technique does not provide a viable solution.

As a coating from which the deposit can be repeatedly removed, a coating of polyterafluoroethylene (hereinafter referred to as "PTFE", (for example, TEFLON™ of DuPont) is known. However, it is not widely used since it is expensive, and the kind of surface on which the PTFE coating can be formed is limited, or it has poor transparency.

It is highly desired to develop a coating such that a deposit can be repeatedly removed from the material surface and which solves the above problems.

As explained above, to remove the deposit from the material is surface, a large amount of work is required, or some other methods applied which use an organic solvent which is harmful to the human body and the environment. In the case of overhead projector (OHP) films or office automation papers such as copying papers, they are used and wasted on a large scale to cause an environmental problem, since ink cannot be removed from their surfaces. This is because there is no coating from which the deposit, such as the ink, is repeatedly removed with ease and which is cheap and has good flexibility in use.

SUMMARY OF THE INVENTION

An object of the present invention is to provide a method of depositing a coating which is formed on the surface of a material and from which a deposit can be easily removed using water, whereby the material's surface can be easily cleaned.

This and other objects are achieved by providing a coating fixed to the surface of a material, the coating comprising a hydrophilic resin which swells with water but is not washed away by the water so as to disappear, and is solid in air at ambient temperature.

When the coating of the present invention is fixed on the surface of the material, a deposit adhering to the surface can be easily removed with water.

The coating of the present invention does not prevent but in fact allows adhesion of the deposit. The coating of the present invention is characterized in that the adhered deposit can be removed from the coating only with water.

From the coating of the present invention, mostly water-insoluble or hardly soluble deposits, such as an oily material, can be removed. Therefore, the present invention is particularly effective with these deposits.

DETAILED DESCRIPTION OF THE INVENTION

The coating of the present invention should be swellable with water. To effectively remove a deposit on the coating, a volume of the coating swells preferably at least 1.5 times the original volume. The volume swell herein used is obtained by dipping a sample having a length of about 1 cm, a width of about 1 cm and a thickness of about several ten $\mu$m in water for 5 minutes, calculating a ratio of the size (length or width) after dipping to that before dipping, and cubing the calculated ratio.

To repeatedly use the coating, it should not be washed away so as to disappear. To form such coating, preferably the resin has a gel content corresponding to a ratio of the resin portion, which is not dissolved in water and washed away of at least 50%, more preferably at least 70%. The resin having such gel content can provide scratch resistance, water resistance and the like to the coating.

To this end, it is effective to crosslink the resin. Examples of crosslinkable functional groups are an epoxy group, an isocyanate group, a double bond, and the like. The functional group can be present in a crosslinking agent and/or in the resin molecule. As a crosslinking source, a chemical crosslinking agent, such as an epoxy crosslinking agent, and isocyanate crosslinking agent etc., or irradiation can be used.

To suppress the washing away or peeling off of the coating, the coating should have adhesion or release resistance to prevent the removal of the coating from the surface of the material. To this end, it is advantageous to treat the material surface or form a layer of material on the surface which is different from the material to be coated.

For example, to improve the adhesion, treatment with or a surface layer of parachlorophenol, trifluoroacetic acid, a silane coupling agent, a titanium coupling agent, an azide compound or a polymer can be employed. When the degrees of swelling of the coating and the material to be coated are different, a surface layer having an intermediate degree of swelling between them can be formed to absorb strain generated therebetween.

The coating of the present invention which is fixed to the surface of the material should contain a resin swellable with water. Such resin has, for example, a polar functional group or a hydrophilic chain. Specific examples of the polar functional group or the hydrophilic chain are a carboxylic acid group, a hydroxyl group, a sulfonic acid group, an amide group, an amino group, a phosphoric acid group or their salts, and a polyethylene glycol chain.

Examples of a resin having the above functional group or the hydrophilic chain are homo- or copolymers of acrylic acid, methacrylic acid, vinyl alcohol, hydroxyethyl methacrylate, dihydroxy-propyl methacrylate, acrylamido-2-methylpropanesulfonic acid, acrylamide, methacrylamide, N,N-dimethylacrylamide, N-acryl-glycinamide, N-isopropylacrylamide, N,N-dimethylaminopropylacrylamide, vinylpyrrolidone, N,N-dimethyaminoethyl acrylate, N,N-dimethylaminoethyl methacrylate, allylamine or their salts, quaternary amino compounds, polyethylene glycol, or copolymers of one or more of these monomers with other monomer.

The hydrophilicity of the resin can be evaluated by a receding water contact angle. In the present invention, the resin having a receding water contact angle of 40 degrees or less, preferably 20 degrees or less, more preferable 10 degrees or less, in particular, about 0 degree is used advantageously used. The receding water contact angle is measured by forming a water drop on the resin film, sucking water with a syringe, and measuring an angle between the water drop and the resin surface with, for example, a protractor, when the edge of water drop starts to move inwardly.

When the coating is treated with the specific aqueous solution and the hydrophilicity is changed by such treatment, the water contact angle should be measured after the resin is dipped in the aqueous solution and dried.

To improve various properties of the coating, it is possible to use components in combination with the hydrophilic resin. For example, the coating composition may optionally contain inorganic powder, a plasticizer, an antistatic agent, a lubricant, a dye or a pigment, a dispersant, a hydrophobic resin and the like.

The present invention makes it possible to use water to remove the deposit from the material surface. Therefore, when the deposit is removed by cleaning with water, the present invention is effectively practiced. When the resin is not sufficiently swelled by the water so that the removal of the deposit is difficult, the removing efficiency of the deposit is improved by increasing the swelling rate of the resin. The use of water containing an electrolyte, an alcohol or the like is effective in most cases.

As the electrolyte, a salt, a base or an acid is suitably used depending of the kind of resin. Examples of the electrolyte are sodium bicarbonate, sodium chloride, acetic acid, potassium hydroxide, sodium hydroxide, hydrochloric acid, sulfuric acid, nitric acid, and the like. Examples of alcohol are methanol, ethanol, isopropanol, and the like.

By the use of a water-soluble resin, it is possible to supply a component or components which are contained in the resin and eluted by water, whereby the properties of coating can be maintained. To increase the removing efficiency of the deposit, a surfactant or the like can be added to the water for cleaning.

When water which is used in the removing step is discarded as such or may contact directly to the human body, the component which is contained in the water or eluted from the coating is preferably one having less adverse influence on the human body and environment, more preferably a biodegradable component.

The swellable coating of the present invention should be in the solid state in air and at ambient temperature to maintain its shape. In view of practical use, the coating in a dry state has a scratch strength of preferably 6 B or harder, more preferably 2 B or harder in a pencil scratching test under a load of 100 g. Practically, it is preferable that the coatings do not stick or adhere to each other when they are contacted.

In some applications, preferably the coating of the present invention is transparent. In such cases, the coating preferably has a transmission of at least 80% of the entire light or a light having a wavelength of 550 nm.

When a substrate to be coated is in the sheet form, the coating of the present invention finds a wide variety of applications. For example, the coating may be used for receiving an ink as the deposit. This is one of the typical examples in which the present invention has good effects. In particular, when the ink is adhered to the substrate, for example a sheet of paper, by copying, typewriting or printing, the present invention is very effective in decreasing the amount of waste paper.

These days, the amount of waste paper generated by printing with printing machines, typewriting with a printer or a typewriter, or printing is considerably increasing. According to the present invention, the coating has compatibility with the ink used in the above application fields, so that ink images can be formed on the coating. Therefore, the use of the coating of the present invention for removal of the ink is very advantageous.

It is advantageous that the coating of the present invention be able to cope with the toner used in an electrophotographic type-copier or a laser beam type printer among the above application fields in view of the amount of paper sheets used in the offices these days.

Of course, it is also advantageous that the coating of the present invention be able to cope with the ink used in other types of typewriting or printing. Examples of the ink are ink-jet printing ink, thermal printing ribbon ink, impact printing ink, typewriter ribbon ink and the like.

In these cases, the coating on the substrate material preferably has heat resistance and mechanical strength so that it does not deteriorate before or after the provision of the ink by copying, typewriting or printing.

As a sheet form substrate, a resin film, a paper sheet, a metal foil or their composite or laminate is suitably used. The sheet form substrate has flexibility and a thickness sufficient for copying, typewriting or printing, and a flatness before and after the deposition and removal of the ink or deposit. That is, the substrate material preferably has heat resistance, water resistance, mechanical properties or shape memory which makes is possible to maintain its flatness.

Preferably, the coating has a shrinkage factor or an expansion factor which makes it possible to maintain the flatness before and after the deposition of the ink by copying, typewriting or printing and removal of the ink. When the coatings are formed on both surfaces of the sheet form substrate, it is possible to use the coatings having a wide range of the shrinkage factor or expansion factor. Preferably, the flatness to be maintained is such that, when the sheet is placed on a flat surface, a height of the highest risen part of the sheet is not larger than 10 mm.

A thickness of the coating of the present invention is preferably from 0.05 μm to 5 μm, more preferably from 0.1 μm to 3 μm. When the thickness is too small, the number of repeated uses is decreased. When it is too large, the coating tends to be damaged when the deposit is removed.

The coating of the present invention can be formed on the substrate material by a conventional method for forming a resin coating on the material. For example, a solution or suspension of the resin is applied on the material surface and dried.

The easy coating of the present invention which is fixed to the material surface should be swellable with water. In a specific application, for example, in the deposition of the above described ink, it is practically preferred that the coating be swelled to a necessary extent in a specific temperature range. That is, at room temperature, the deposit adheres to the coating but hardly is removable, while the deposit is easily removed at a temperature different from the room temperature. The removal temperature of higher than 20° C. is suitable for the use of a coating of this nature and also for designing the removing step. A temperature of 28° C. or higher is most preferred.

Examples of the resins which achieve the above effect, have a nitrogen-containing group and/or an organic acid group, or mixtures thereof. Examples of the nitrogen-containing group and organic acid group are an amide group, an amino group, a carboxylic acid group, and the like. Examples of the resins having such functional group and the mixture thereof are homo- or copolymers of acrylamide, methacrylamide, N,N-dimethylacrylamide, N-acrylglycinamide, N-isopropylacrylamide, N,N-dimethylaminopropyl-acrylamide, vinylpyrrolidone, acrylic acid, methacrylic acid, etc., copolymer of one or more of the above monomers with other monomers, and mixtures thereof.

Typical examples are polyacrylic acid, polyacrylamide, a mixture of polyacrylic acid and polyacrylglycinamide, and a mixture of polyacrylic acid and polydimethylacrylamide. In the case of polyacrylamide, the swelling in the molecule level in the presence of water at a temperature higher than 29° C. was proved (see Hiroki Katono et al, "HYOMEN" (Surface), 30 (1992) 30).

It is preferred that the ink be deposited on the coating by a specific writing means including copying, typewriting and printing and then removed from the coating.

The easy coating of the present invention fixed to the material surface and comprises the hydrophilic resin which is swelled by the water but not washed away and does not disappear, and is solid in the air at room temperature and can be widely used for the purpose of the removal of deposits. For example, the coating of the present invention can be used in the following applications.

To remove ink, the coating is formed on the OHP sheet, a sheet of paper or paper-like material, a celluloid picture sheet, and the like.

To remove stains such as oil, the coating can be formed on building materials, furniture, ventilation equipment, kerosene heaters, electric appliances, gas equipments, tools, tablewares or other daily necessaries. In particular, the coating is effectively used in places which are stained by oils, paints, and the like, for example, a kitchen, a workshop where a machine is used or a paint is applied.

For masking purpose, the coating of the present invention can be used in a painting step or preparation of graphics. In view of good hydrophilicity of the resin which is swelled with water, the coating can be used as an anti-fogging film.

PREFERRED EMBODIMENTS OF THE INVENTION

The present invention will be explained further in detail by the following examples.

In Examples, as deposits there were used a machine oil which is relatively easily removed and a toner ink which is baked in the copying process by an electrophotographic type copier and is the most firmly adhering material to the substrate among the deposits.

Example 1

A composition of the following components is charged in a flask equipped with a condenser and reacted at 80° C. while stirring until an increase of viscosity was observed:

| Component | Parts by weight |
| --- | --- |
| Polyethylene glycol (MW = 1000) | 10 |
| Crosslinking agent (adduct of trimethylolpropane with 3 moles of tolylene diisocyanate) | 9.7 |
| Cyclohexanone | 23 |
| Toluene | 23 |

The resulting resin solution is coated in a wet thickness of 60 μm on a polyethylene terephthalate film having a thickness of 100 μm and dried, followed by treatment at 70° C. for 3 days to obtain a film which consisted of the crosslinked hydrophilic resin fixed to the substrate material.

Separately, the resulting resin solution is coated on a release paper at a wet thickness of about 200 μm and dried, followed by treatment at 70° C. for 3 days to prepare a sample for measuring the volume swell and a gel content. Water is used as a treating liquid in the removal step of the toner ink and the measurements of volume swell and gel content.

Example 2

A composition of the following components is mixed at room temperature to obtain a resin solution:

| Component | Parts by weight |
| --- | --- |
| Commercially sold hydrophilic resin (A copolymer of acrylic acid salt and vinyl alcohol in a weight ratio of 4:6) | 10 |
| Crosslinking agent | 0.025 |

-continued

| Component | Parts by weight |
| --- | --- |
| (tetrafunctional epoxy compound with a tertiary amine group in a molecule) | |
| Isopropanol | 7.6 |

The resulting resin solution is coated in a wet thickness of 300 μm on a polyethylene terephthalate film having a thickness of 100 μm and dried, followed by treatment at 110° C. for 5 hours to obtain film which consists of the crosslinked hydrophilic resin, fixed to the substrate material.

Separately, the resulting resin solution is coated on a TEFLON™ sheet adhered on a glass plate in an amount of 25 g per 100 cm$^2$ and dried, followed by treatment at 110° C. for 5 days to prepare a sample for measuring volume swell and a gel content. Water was used as the treating liquid in the removal step of the toner ink and in measuring the volume swell and gel content.

Example 3

A composition of the following components is charged in a flask equipped with a condenser and reacted under nitrogen stream at 70–80° C. for 10 hours while stirring to obtain a 15 wt. % solution of a hydrophilic resin A in isopropanol.

| Component | Parts by weight |
| --- | --- |
| Methacrylic acid | 9 |
| Acrylic acid | 1 |
| 2-Hydroxyethyl methacrylate | 13 |
| Acrylamide | 1 |
| N,N-Dimethylaminoethyl methacrylate | 1 |
| Azobisisobutyronitrile | 0.38 |
| Isopropanol | 142 |

Then, the following mixture was mixed at room temperature to obtain a resin solution:

| Component | Parts by weight |
| --- | --- |
| Solution of Resin A in isopropanol | 10 |
| Crosslinking agent [a mixture of glycidylether of glycerin, glycidylether of polyethylene glycol (ethylene glycol = ca. 4 moles) and polyethylene glycol-glycidyl ether of sorbitol in a weight ratio of 8:1:1] | 0.075 |

The resulting resin solution is coated in a wet thickness of 60 μm on a polyethylene terephthalate film having a thickness of 100 μm, a surface of which treated with polyurethane (easy adhesion treatment) and dried, followed by treatment at 110° C. for 5 hours to obtain a film which consists of the crosslinked hydrophilic resin and is fixed to the substrate material.

Separately, the resulting resin solution is coated on a release paper having a wet thickness of about 350 μm and dried, followed by treatment at 110° C. for 5 hours to prepare a sample for measuring volume swell and gel content. A 1 wt. % aqueous solution of sodium bicarbonate is used as a treating liquid in the removal step of toner ink and in the measurements of volume swell and gel content.

Example 4

In the same manner as in Example 3 except that an aqueous solution containing 1% by weight of the resin A and 1% by weight of sodium bicarbonate was used as a treating liquid in the removal step of toner ink and the measurements of volume swell and in gel content, the experiments were carried out.

Comparative Example 1

In the same manner as in Example 1 except that no film was formed on the polyethylene terephthalate film, the experiments were carried out.

Comparative Example 2

A 5 wt. % aqueous solution of a commercially sold resin (a copolymer of an acrylic acid salt and vinyl alcohol in a weight ratio of 4:6) is coated in a wet thickness of 120 μm on a polyethylene terephthalate film having a thickness of 100 μm and dried, followed by treatment at 110° C. for 5 hours to form a coating of the resin which was not crosslinked substantially.

Separately, the resulting resin solution is coated on a TEFLON® sheet adhered on a glass plate in an amount of 14 g per 100 cm$^2$ and dried, followed by treatment at 110° C. for 5 days to prepare a sample for measuring the swell and a gel content. Water was used as the treating liquid in the removal step of toner ink and in the measurements of volume swell and gel content.

Comparative Example 3

In the same manner as in Example 3 except that as a substrate film on which the coating film is formed, a polyethylene terephthalate film which had not been surface treated is used and, the coating film was formed. The same treating liquid as used in Example 3 is used in the removal step of toner ink and the measurements of volume swell and gel content.

On the coating film obtained in each of Examples 1–4 and Comparative Examples 2 and 3 or the film of Comparative Example 1, a machine oil is applied with a brush in an area of about 1 cm×2 cm, or characters of the toner ink were copied by the electrophotographic type copier. As the characters, 12 point Gothic alphabet characters were printed. When the resin A was used, the substrate film carrying the film is dipped in the treating liquid for 20 minutes and dried before the application of machine oil or copying of the characters, since the hydrophilicity of the coated film was improved by the treating liquid. Then, the removability of the mahcine oil or copied characters and other properties were evaluated as follows:

Volume Swell

The sample for measuring the volume swell is cut to a size of about 1 cm×1 cm and dipped in the treating liquid for 5 minutes. From the measured sizes before and after dipping, a ratio of the side length is calculated and cubed to obtain a volume swell.

Gel Content

About 0.1 g of the sample is weighed, dipped in 50 ml of the treating liquid and subjected to ultrasonic wave at a defined frequency for 30 minutes. Then, the treating liquid is changed and the same procedure is repeated. The undissolved portion of the sample was dried at 80° C. till no weight change is observed (about one week). From the weight difference before and after the above treatment, a weight percentage of the undissolved portion is calculated as a gel content.

Receding Water Contact Angle

A water drop is formed on the film surface, water is sucked with a syringe, and an angle between the water drop and the film surface with is measured with a protractor, when the edge of water drop starts to move inwardly.

Pencil Scratching Test

The pencil scratching test is carried out according to JIS K 5400 except that a load is changed to 100 g.

Sticking-Adhesion Test

The coated surfaces of a pair of substrate films are laminated and kept standing for one day with placing a weight of 1 kg at the center of the films to evaluated the sticking and adhesion properties. The sticking and adhesion are ranked as "O" (neither sticking nor adhesion is observed), "Δ" (sticking is observed) or "X" (adhesion is observed).

Light Transmission

Using a UV-visible light spectrophotometer (200-20 Type Double Beam Spectrophotometer manufactured by Hitachi), a light transmission at a wavelength of 550 nm is measured.

Maintenance of Flatness

After copying the characters using a electrophotographic type copier (NP 5060 manufactured by Canon), the film is placed on a flat surface and the height of the highest part of the film is measured.

Deterioration of Coating

After five times removal of the deposit, a condition of coating is observed with naked eyes or an optical microscope.

Removability of Machine Oil

The surface of each film is wiped with a sponge for photography in running water to check the removability of machine oil and ranked as "OO" (removed with running water only), "O" (completely removed with gentle wiping) or "X" (with strong wiping, the machine oil is not removed but is spread).

Removability of Toner Ink

After each film is dipped in the treating liquid for 20 minutes, a surface of the film is wiped with a sponge for photography in running water to check the removability of toner ink and ranked as "OO" (removed with running water only), "O" (completely removed with gentle wiping) or "X" (not removed with strong wiping).

Repeated Removability of Toner Ink

After carrying out the procedure in the above test of removability of toner ink, water is thoroughly removed with a hair dryer, and copying of the characters with toner ink and their removal are repeated, and the number of copies while the toner ink is completely removed is counted.

The results are shown in Tables 1 and 2.

TABLE 1

| Property | Example 1 | Example 2 | Example 3 | Example 4 |
| --- | --- | --- | --- | --- |
| Volume swell (times) | 2 | 50 | 11 | — |
| Gel content (%) | 95 | 60 | 90 | — |
| Receding water contact angle (°) | 15 | <5 | <5 | — |
| Pencil scratch test | B | 2H | 4H | — |
| Sticking-adhesion test | Δ | O | O | — |
| Light transmission (%) | 77 | 86 | 86 | — |
| Maintenance of flatness (mm) | 0–4 | 0–7 | 0–4 | — |
| Deterioration of coating after 5 removals | Substantially no | Substantially no | Minute cracking | Substantially no |
| Removability of machine oil | O | OO | OO | OO |
| Removability of toner ink | O | O | OO | OO |
| Repeated removability of toner ink | 5–15 | 10–20 | 10–20 | >20 |

TABLE 2

| Property | Co. Ex. 1 | Co. Ex. 2 | Co. Ex. 3 |
| --- | --- | --- | --- |
| Volume swell (times) | 1 | Not measurable | — |
| Gel content (%) | 100 | 0 | — |
| Receding water contact angle (°) | 60 | — | — |
| Pencil scratch test | >4H | — | — |
| Sticking-adhesion test | O | — | — |
| Light transmission (%) | 88 | — | — |
| Maintenance of flatness (mm) | 0–3 | — | — |
| Deterioration of coating after 5 removals | — | Whole coating was dissolved after one removal | |
| Removability of machine oil | X | OO | OO |
| Removability of toner ink | X | OO | OO |
| Repeated removability of toner ink | 0 | 1 | 1 |

As seen from the results in Tables 1 and 2, the deposit easy removal coatings which were formed on the substrate material according to the present invention (Examples 1–4) had better removability of toner ink or better repeated removability of toner ink than the films of Comparative Examples 1–3, not having the coating of the present invention.

Since the coating of the present invention is effective for removing repeatedly the toner ink it is, of course, effective for other deposits.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of reusing a coated substrate comprising the steps of:

(a) allowing the coated substrate, which carries deposits on its surface, to swell as a coated composition to which said deposits adhere, and (b) removing said deposits from said coated substrate to reuse the substrate which comprises a material substrate and a coating composition fixed to the surface of said material substrate, said coating composition comprising a crosslinked water swellable hydrophilic resin which is capable of swelling to a volume at least 1.5 times its initial volume, and is solid in air at ambient temperature and from which surface deposits are readily removable, such that said coated material substrate is reusable, and wherein the condition of said swellable hydrophilic resin is such that while said hydrophilic resin swells in the presence of water it is not washed away from said surface of said material substrate by said water when the deposits are readily removed with water.

2. The method of reusing a coated substrate according to claim 1 wherein the swellable hydrophilic resin has a gel content of at least 50%.

3. The method of reusing a coated substrate according to claim 1, wherein said swellable hydrophilic resin is crosslinked chemically through a functional group selected from the group consisting of an isocyanate group, an epoxy group, and a double bond.

4. The method of reusing a coated substrate according to claim 1, wherein said swellable hydrophilic resin is crosslinked by irradiation of said functional group.

5. The method of reusing a coated substrate according to claim 1, wherein said swellable hydrophilic resin has a polar functional group or a hydrophilic chain.

6. The method of reusing a coated substrate according to claim 5, wherein said polar functional group or hydrophilic chain is selected from at least one member of the group consisting of a carboxylic acid group, a hydroxyl group, a phosphoric acid group and their salts, and a polyethylene glycol chain.

7. The method of reusing a coated substrate according to claim 1, wherein said hydrophilic resin swells in the presence of water without being washed away at a specific temperature of at least 20° C.

8. The method of reusing a coated substrate according to claim 1, wherein said hydrophilic resin comprises at least one member from the group consisting of a nitrogen-containing group and an organic acid group.

9. The method of reusing a coated substrate according to claim 8, wherein said nitrogen-containing group and said organic acid group comprise an amide group, or an amino group, or a carboxylic acid group.

10. The method of reusing a coated substrate according to claim 1, wherein said deposits on said coated substrate comprise a toner ink.

* * * * *